Jan. 17, 1939.  A. E. HILL  2,143,879
EXPANSIBLE RAIL JOINT
Filed Aug. 4, 1936   5 Sheets-Sheet 1
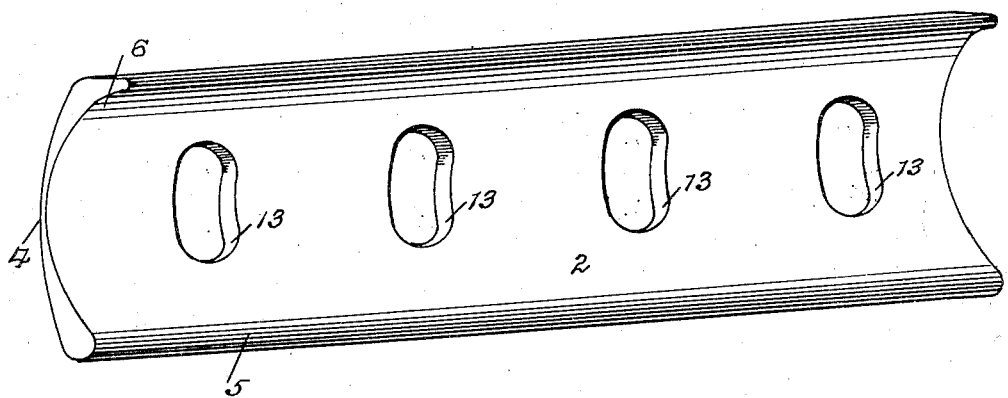
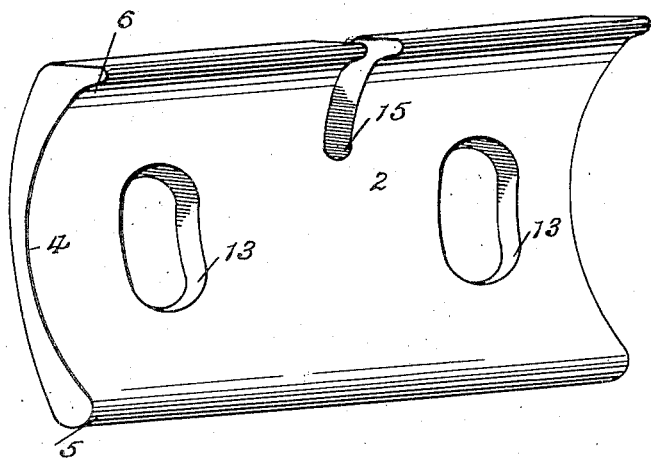
Inventor
Albert E. Hill,
By William A. Deane
his Attorney Jan. 17, 1939.  A. E. HILL  2,143,879
EXPANSIBLE RAIL JOINT
Filed Aug. 4, 1936  5 Sheets-Sheet 3

Inventor
Albert E. Hill,
By William W. Deane
his Attorney

Jan. 17, 1939.　　　　　A. E. HILL　　　　　2,143,879
EXPANSIBLE RAIL JOINT
Filed Aug. 4, 1936　　　　5 Sheets-Sheet 4
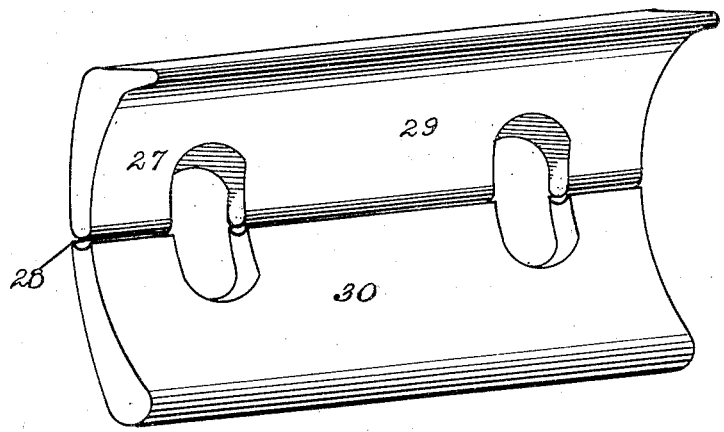
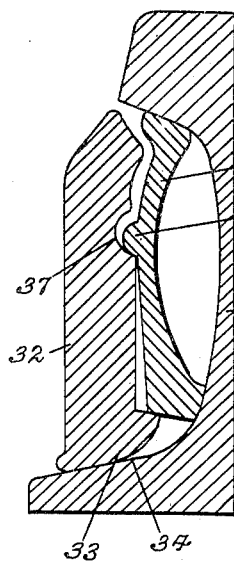 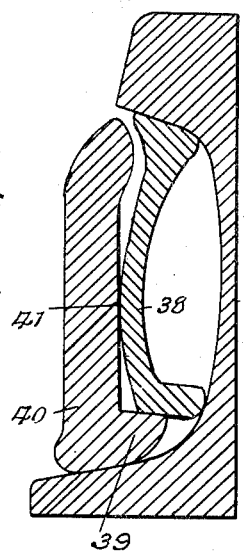 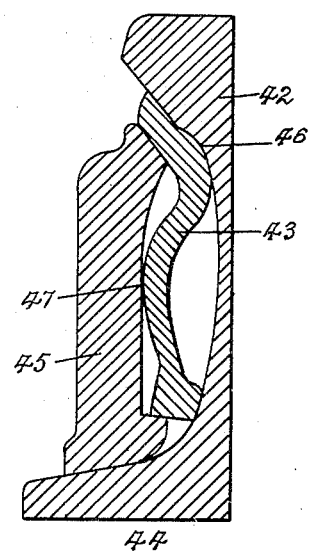
Inventor
Albert E. Hill,
By William W. Deane,
his Attorney Jan. 17, 1939.  A. E. HILL  2,143,879
EXPANSIBLE RAIL JOINT
Filed Aug. 4, 1936  5 Sheets-Sheet 5

Inventor
Albert E. Hill,
By William W. Deane
his Attorney

Patented Jan. 17, 1939

2,143,879

UNITED STATES PATENT OFFICE 2,143,879

EXPANSIBLE RAIL JOINT

Albert E. Hill, New York, N. Y.

Application August 4, 1936, Serial No. 94,277

6 Claims. (Cl. 238—244)

This invention is directed to an improvement in expansible rail points, wherein an element of the joint is subjected to an increase of height under increased tension of the securing bolts, to thereby increase the fishing height of the joint as a whole to compensate for any rail end variation.

The primary object of the invention is the provision of a rail joint to be initially applied of an appropriate fishing height to maintain rail end level, and capable of adjustment thereafter through simple tightening of the securing bolts to increase the fishing height of the joint to again provide rail end level after running wear of such rail ends, this capability of adjustment being available through out the full life of the rails.

A further object of the invention is the provision of a rail joint in which the fishing height adjustment member is constructed to permit variation in positioning of the respective rail ends, the member being capable of increasing the adjustment of one rail end to an extent differing from the adjustment of a meeting rail end, whereby the meeting rail ends may be raised to rail level regardless of their difference in depression due to wear and travel.

A further object is the provision of a rail joint in which the adjustment member may be independently renewable when necessary without corresponding renewal of the remaining member of the joint, thus facilitating the provision of a new rail joint through the mere substitution of a part thereof, a characteristic highly important from the standpoint of economy and saving of time and labor.

A further object of the invention is the provision of a rail joint in which the expansible member maintains a rail-web contact at all times, and thus under the tension of the securing bolts, serves to correct and keep rail alinement, so that during adjustment for fishing height the rail ends are also alined to thus secure both necessary adjustments for the meeting ends of the rails.

A further object is the provision of a rail joint including a rigid splice bar and a curved inner section having load bearing in the splice bar and fulcrum bearing against the web of the rail, the securing bolts passing through the splice bar and curved inner section and acting under appropriate tension to tend to straighten the curved inner section and thus raise the upper end of such curved inner section to raise its relatively broad upper end having bearing beneath the ball of the rail.

A further object is the provision of a rail joint of this character in which the fulcrum bearing of the inner curved section is above the longitudinal median line of such section, to insure a relatively increased movement of the part below the fulcrum over that above such fulcrum, to the end that in adjustment for fishing height the broad bearing between the upper end of the curved section and the ball of the rail will be maintained in its full area of contact.

A further object is the provision of a rail joint of the type described, wherein the curved inner section may have its load contact in a channel in the splice bar, on the rail-flange engaging portion of the splice bar, or through a projection at the fulcrum point of the curved section seating in a channel in the splice bar, as may be expedient; and wherein the upper or bearing end of the curved section may be formed for appropriate supporting contact with the head or ball end of differently-formed rails, to insure conforming contact and support.

A further object is the provision of a rail joint of the character described, wherein through the intimate pressure contact of the curved section with the rail web an effective electric bonding action is provided, serving to insure electrical continuity of the rails where the usual bonding conductors are dispensed with or become for any reason ineffective.

The invention is illustrated in the accompanying drawings, in which:—

Fig. 1 is a perspective view of the curved inside section of the improved rail joint.

Fig. 2 is a similar view showing a slightly modified form of the curved section.

Fig. 13 is a perspective view of a modified form of curved inner section, showing the same constructed in two parts.

Fig. 14 is a view in section showing the inner curved section in reverse position with two loading contacts.

Fig. 15 is a view in section with the curved inner section in reverse position with one loading contact.

Fig. 16 is a view in section, showing modified form of the construction, with the curved inner section in reverse position for a headfree rail.

Figure 3:
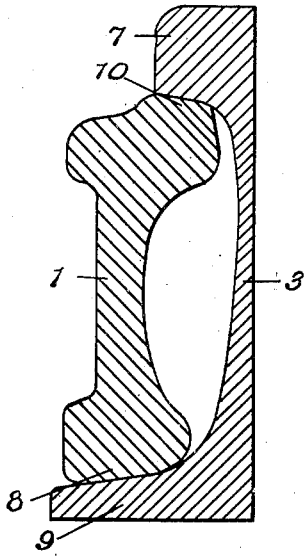
Fig. 3 is a vertical sectional view, showing standard head contact angle bar in normal position.

Recent developments in machine tools have made it possible to rehabilitate nearly all types and sizes of angle bars, except the smallest and oldest, now in use, with the addition of curved inside expanding parts. These new machine tools can be put into a powered, self propelled car, and work over the old angle bars, as the car moves over the track, this equipment having a capacity to work approximately a mile of track per day per unit.

Students of the progressive wear on rail joint and rail ends have learned that joint wear takes place at the center of the bars and on the rail ends contact surface and that most all of this wear is on the top of bars and under surface of balls, extending back just a few inches from the center of the joint assembly. Thus, the center bolts can be tightened more than the end bolts and this tightening makes the fishing contact at ends of bars, fulcrum points, on which the center bolt tightening pulls bars to an inward bow and the joint assembly into a slight depression, rather than holding the rails up to a straight running surface on the balls of the rails. Very little wear takes place on the bottom contacts of bars to flanges of rail base. Thus it will be seen the advantage of eliminating the bearing contact on ends of bars with fishing surfaces of rails, so that the tightening of joint assembly will always give free action to lift or keep the running surface of the rail up to proper line.

The improved rail joint is constructed of two parts, one, a rigid splice bar, which may be conventional or of special form, and the other a curved inside section, hereinafter referred to as the curved element. The curved element, which constitutes the main part of the present invention is of concavo-convex shape in vertical section, preferably of an appropriate thickness, and of spring steel. The lower end of the curved element has a load support, and the upper end is formed with a head to engage beneath the ball of the rail or rails. The curvature of the element is such that it has a fulcrum bearing against the web of the rail, with this fulcrum point above the longitudinal median line of the element. The splice bar and element are formed with holes for the usual securing bolts, such holes being vertically elongated in the curved element. Under the tensioning effect of the securing bolts, the curved element is gradually forced into successive curves of greater radius, tending toward a straight-line position. As the lower end of the curved element is supported against downward movement, the upper end is gradually forced upwardly, carrying the rail ends to a final position of proper alignment. As the curved element has fulcrum bearing against the web of the rail, the pressure of the bolts will naturally exert web pressure on the rails, tending to their longitudinal alinement.

The broad construction above described readily lends itself to modification, both as to the special construction of the curved element, its loading point or points, its length relative to the length of the splice bar, and its use with a conventional or modified type of splice bar.

The rail joint of this invention comprises a rigid splice bar 1 and a curved section 2, the latter being placed between the bar 1 and the rail 3. The curved inner section is concavo convex vertically and has a fulcrum point 4 bearing against the rail web. The curved section in its preferred form is so curved that its fulcrum point is at a point about two-thirds of its height, and the metal of the curved section is gradually thickened in both directions from the fulcrum point.

The curved section 2, as shown in Fig. 1 is formed at its lower end with a rounded foot 5 and at its upper end with a relatively broad head 6 to conform snugly to the under side of the ball of the rail, indicated at 7. The splice bar 1 is formed with the conventional foot 8 bearing on the inclined flange 9 of the rail, such bar being as usual provided with a head 10 to bear beneath the ball 7 of the rail, as shown in Fig. 3.

Figure 4:
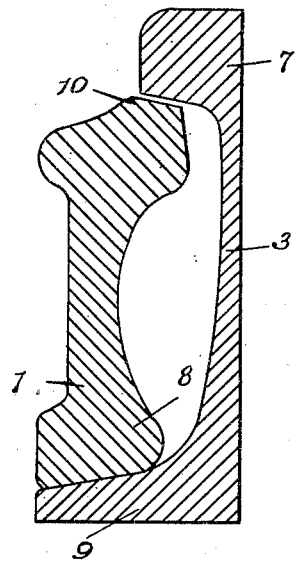
Fig. 4 is a similar view showing the same type of angle bar positioned outward from the rail for clearance on top of bar with the underside of the rail ball and for part of the working space for the reception of the improved curved inside section. The balance of the working space, seating channel and wheel-flange clearance, all three, being made simultaneously by machine cuts later described.
Figure 5:
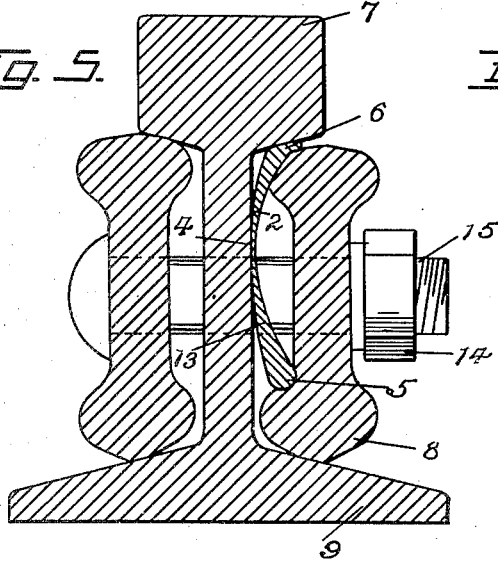
Fig. 5 is a view in vertical section showing another type of angle bar, one side showing the angle bar in normal position and the other side showing the curved inside section.

For the purposes of this invention the splice bar is moved outwardly, and the curved section 2 is interposed between the bar 1 and the rail web. In this position as seen in Fig. 4, the head 10 of the bar is spaced from the ball of the rail, while the head 6 of the curved section bears beneath and conforms to the under side of the rail ball. The rounded foot 5 of the curved section has load bearing in a longitudinal channel 11 in the inner side of the bar 1, above the foot 8 thereof.

In this position the curved section 2 has a load bearing in the bar 1, has a fulcrum bearing against the web of the rail, and bears beneath and conforms to the ball of the rail. The bar 1 and rail web are formed with the usual bolt holes 12, and the curved section 2 is formed with registering holes 13, which are somewhat elongated vertically. When the nuts 14 are tightened the bar 1 is moved inwardly and as it carries the foot of the curved section, and bears against the latter immediately below the rail ball, pressure is exerted on both ends of the curved section, which of course has fulcrum bearing against the rail web. This movement of the bar 1 tends to increase the radius of curvature of the curved section, moving it toward a straight line. The foot end of the curved section is immovable vertically except for the slight inclined movement of the foot of the bar 1, and as a result the upper or head end of the curved section moves upwardly, raising the end of the rail ball.

Figure 6:
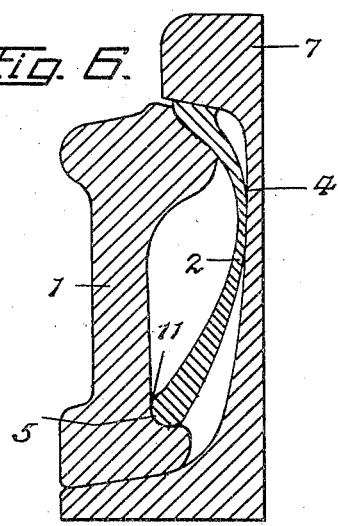
Fig. 6 is a view in vertical section, showing same type of angle bar as in Figs. 3 and 4, with the curved inside section in position.

The upper portion of the curved section 2 in Figure 6 above its fulcrum is shorter than the section below the fulcrum point. Thus under the tension of the bolts, the lower section moves inwardly to a greater extent than the upper section. The tendency toward straightening of the curved section is thus accomplished without very materially moving the upper end of the head of the curved section, to thus insure proper bearing between the head of the curved section and the ball of the rail, and permitting a greater area of contact at the head end of the curved section.

The curved section is preferably of the same length as the bar 1, but if desired the length of the curved section may be less than that of the bar. Thus the bar may have six bolt holes, and the curved section may have an equal number of bolt holes or may be of a length to utilize only four bolt holes. The preferred construction is to have the curved section of the same length as the bar, thus increasing the effective length of the curved bar.

The movement of the curved section 2 under bolt tension will obviously raise the rail ends to normal level, and as the curved section in accomplishing this adjustment moves toward a straight line position, it will be apparent that with the parts properly fitted and sized for the particular rails, provision is made for repeated adjustments of the curved section under successive compensations for such rail wear. Thus the joint when once applied is effective for fishing-height adjustments to compensate for wear for the full effective life of the rail, and these successive adjustments are accomplished by merely tightening the nuts on the bolts.

In some instances, particularly in handling large rails, more or less independent adjustments for the ends of the respective rails are desirable. For this purpose the curved section is formed with a vertical slot 15, extending from the head end to approximately the fulcrum point. Thus the upper portion of the curved section is made of two independently movable parts, and under appropriate tightening of the bolts, one part may be adjusted inwardly to a greater extent than the other part. As the slot is aligned with the meeting ends of the rails, this construction provides for fishing-height fit on four sides that may be all at variance.

In the use of the curved section 2 with angle bars of old construction, the latter are cut away to avoid wheel flanges, as at 24, and the inner surface of the bar is cut away to provide working space and proper pressure surface for the upper end of the curved section, as at 23. When new rolled bars 1 are constructed particularly for the improved joint, such bars will be originally formed to provide for these contingencies.

It is of course known that the wear on meeting rail ends is on the upper and under surfaces, that is with the use of the conventional type of rail joints. Thus it may be advisable in compensating for this wear to adjust the fishing height of the curved section 2 to different planes longitudinally of its upper or head end. Thus by tightening the central bolts of the joint to a greater extent than the remaining bolts, the central portion of the head end of the curved section will be forced inwardly to a greater extent than the end portions of such curved section. This will of course result in raising the rail ends to the desired level without corresponding raising of the rail portions beyond such ends.

Figure 7:
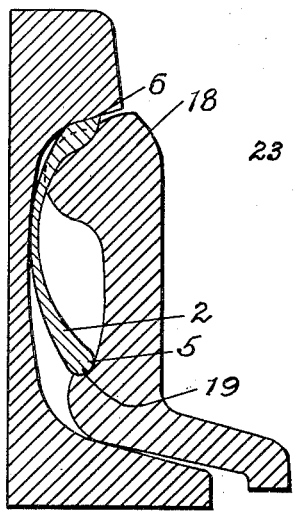
Fig. 7 is a view in section, showing standard type angle bar with the curved inside section in place.

Fig. 7 shows a standard type toe angle bar 18, with the curved inner section 2 in applied position, the angle bar being channeled at 19 for a loading support for the curved section.

Figure 8:
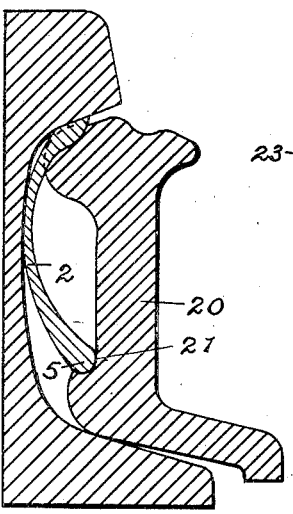
Fig. 8 is a view in section with the type of curved section in place with a different type of angle bar.

Fig. 8 shows a somewhat different type toe angle bar, 20, with the inside curved section in applied position. The bar has the loading channel 21 for the curved inside section, and the upper end of the bar is cut away to accommodate the head end of the curved inside section and to avoid wheel flanges.

Figure 10:
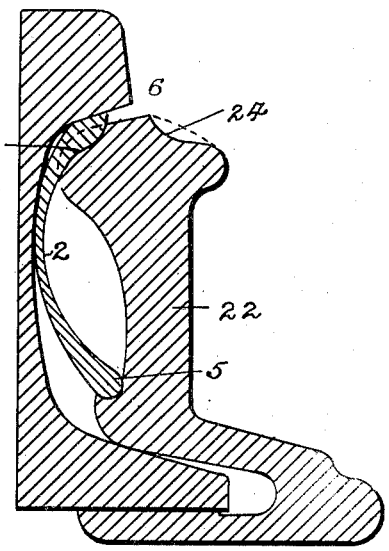
Fig. 10 is a similar view showing the curved inner section in place.
Figure 9:
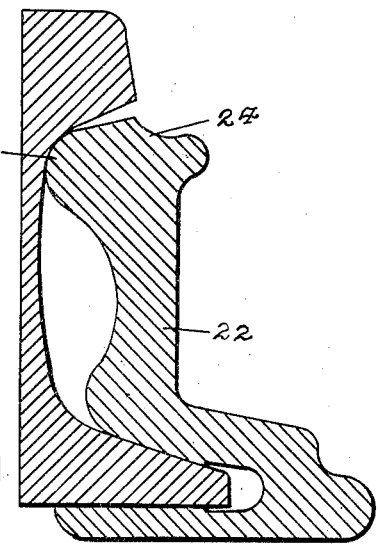
Fig. 9 is a view in section showing standard types of headfree continuous angle bar in normal position.

Figs. 9 and 10 show headfree continuous angle bars on standard rail sections, Fig. 9 showing the bar in normal position and Fig. 10 with the inside curved section in place. In both figures, the bars 22 are cut out at 23 to accommodate the inside curved section and at 24 to clear wheel flanges.

Figure 11:
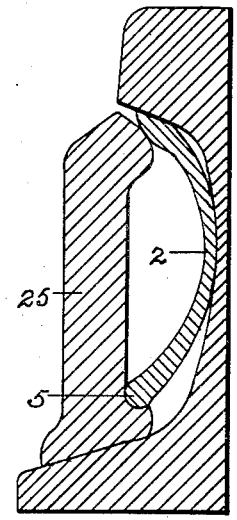
Fig. 11 is a view in section showing a type of new modern rolled angle bars with the curved inner section in place.
Figure 12:
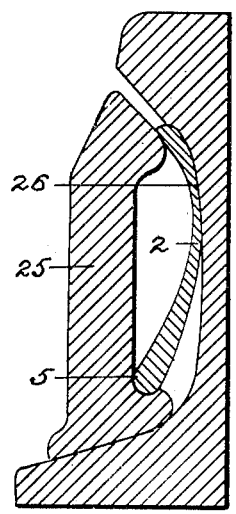
Fig. 12 is a view in section showing headfree rail with new rolled type angle bar and inner curved section in place; also showing the inner curved section in contact with the rail web throughout its upper part.

Fig. 11 illustrates modern design new rolled angle bar 25, with inside curved section in place. Fig. 12 shows similar type of new angle bar with head free rail, and as the lower corner of the ball of the rail is omitted, the curved inner section 2 is applied to have full contact around the fillet of the rail and down the web for approximately that portion of the curved section above the fulcrum or about one-third of the vertical dimension, as indicated at 26.

Fig. 13 shows a modified form of curved inner section. Here the section, indicated generally at 27, is divided at the fulcrum point 28 into two sections, the upper section 29 having load bearing on the lower section 30. In this form the action is similar to the preferred form. Within the scope of this modification the sections of the expansible section may be made straight instead of curved, in which case the action is a wedging one. This straight form does not require illustration, and it is described merely to indicate that such straight form is within the disclosure of the present invention.

In the modification illustrated in Fig. 14, the curved inner section, here indicated at 31, is curved reversely from that of the preferred form. The angle bar 32 has its foot portion 33 for wedging cooperation with the flange 34 of the rail 35, and the upper portion of this foot 33 provides a loading point for the lower end of the curved section. The curved section has a second loading point through a projection 36 at its fulcrum fitting a channel in the inner surface of the angle bar, as shown at 37.

In Fig. 15 the curved inner section 38 is reversely curved with respect to the preferred form, has a loading point on the foot 39 of the angle bar 40, and a fulcrum point 41 on the angle bar, as shown.

In Fig. 16, the rail is shown as a headfree rail at 42, and the curved section 43 is reversely curved, is supported on the foot 44 of the angle bar 45. The upper portion of the curved section 43 has an extended bearing at 46 on the head of the rail, and the end-pressure face of the angle bar acts on the curved section within the limits of this bearing. The curved section has a fulcrum point on the angle bar at 47.

Figure 17:
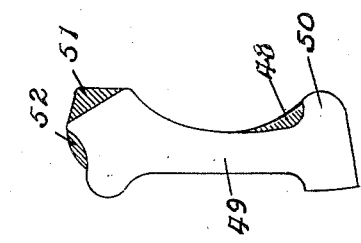
Fig. 17 is an edge view of a toeless angle bar adapted for the invention.

In Fig. 17, there is shown a toeless angle bar adapted for the present invention. The channel 48 in the angle bar 49 for base load contact of the curved section is formed as an enlargement of the fillet of the lower rib 50. The upper end of the bar is cut away at 52 to avoid wheel-flange contact, and on the inner side at 51 to provide working space and a pressure seat for the head end of the inner curved section.

Figure 18:
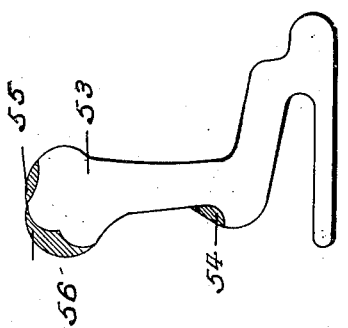
Fig. 18 is a similar view of a headfree continuous angle bar adapted for the invention.

In Fig. 18 there is illustrated a headfree continuous angle bar 53 having a load-contact channel 54. and cut away at the head end to avoid wheel flanges, as at 55 and providing working space and a pressure seat at 56 on the inner side.

Figure 19:
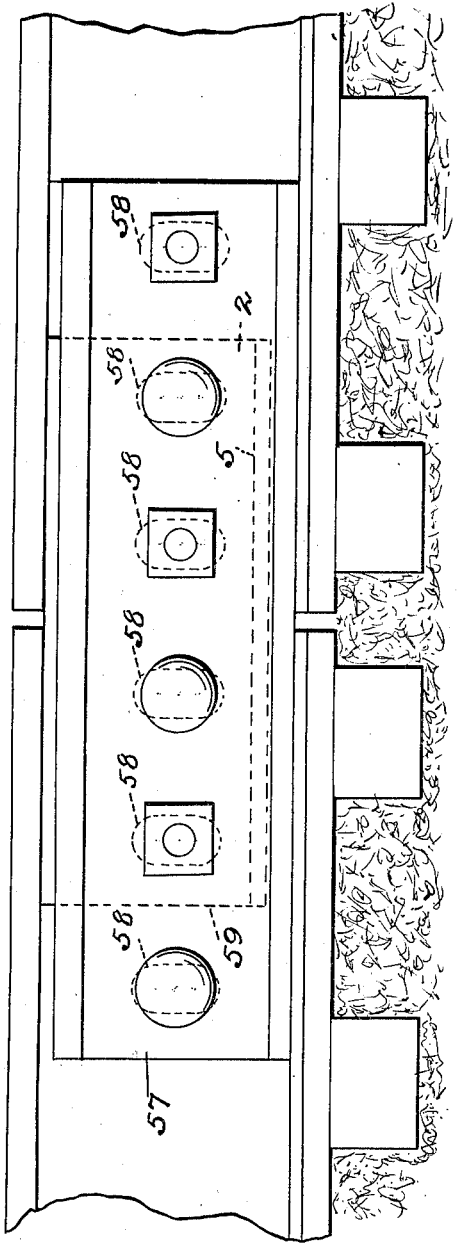
Fig. 19 is a side view showing an angle bar for six tightening bolts combined with an inner curved section cooperating with but four of such bolts.

In Fig. 19, the angle bar 57 is shown as provided with six bolt holes 58, while the curved inner section, shown in dotted lines at 59 is of a length to include but four of the six bolt holes of the angle bar. It is quite apparent that the bolts passing through the curved center section may be tightened more than the end bolts, or the two central bolts tightened more than the remaining bolts. In the latter case the central portion of the curved section will be caused to assume a greater fishing height than the remaining portions of such section, bringing the rail ends and immediately adjacent portions to alinement.

In all forms the salient feature is the provision of a section with a normal curvature vertically, which has a fulcrum bearing, so that under pressure of the angle bar, incident to tightening of the securing bolts, the curved section is forced to a position gradually approaching a straight line. Obviously, this adjustment, incident to the loading support of the curved section and its bearing against the ball of the meeting ends of the rails will raise such meeting ends into rail alinement, and thus readily and easily compensate for wear. Of course the curved section will be continuously responsive to further adjustments from time to time by merely increasing the tension of the bolts, and thus without disturbing any parts and the simple operation of bolt tightening, successive adjustments are made easily possible.

Furthermore, the fulcrum bearing of the curved section against the rail webs will result in a pressure against the webs with a result of securing web alignment during adjustment for wear compensation. Again the intimate and pressure contact of the curved section against the rail web provides an electric bonding effect, which is serviceable directly as such, or as an emergency bonding in the failure of the usual bonding connections.

While it is contemplated that the successive adjustments possible will take care of all necessary adjustment during the life of the rail, it may be that renewal may become necessary. Under these circumstances, the only part to be renewed is the inner curved section, the angle bar being used as before. Thus from the standpoint of labor saving and economy of material, the improved rail joint presents valuable features.

Having thus described the invention, what is claimed as new, is:—

1. An expansible joint connection for the meeting ends of rail-road rails comprising a rigid splice bar disposed laterally of the rails and lapping the ends thereof, said splice bar having a longitudinal shoulder on its inner side near the lower edge thereof, a transversely curved flexible element disposed between the opposed surfaces of the splice bar and rails, said element having its lower edge in load bearing contact with said shoulder of the said splice bar, its upper edge in wedging relation between the splice bar and the fishing surface of the rail heads, and its body portion intermediate the lower and upper edges thereof having a fulcrum bearing on one of said opposed surfaces, and bolts extending through said splice bar, flexible element, and rail webs for drawing said splice bar toward the rails and decreasing the curvature of said flexible element and thereby expanding the fishing height of the joint connection.

2. The structure defined in claim 1, wherein said flexible element is relatively thin adjacent said fulcrum bearing and increases in thickness therefrom toward the upper and lower edges thereof.

3. The structure defined in claim 1, wherein the line of fulcrum bearing is disposed above the longitudinal median line of said flexible element.

4. The structure defined in claim 1, wherein the flexible element is provided with a vertical slot alined with the meeting ends of the rails, the slot extending from the upper edge to the fulcrum bearing point of the element.

5. The structure defined in claim 1, wherein the fulcrum bearing of the flexible element is on the rail webs.

6. The structure defined in claim 1, wherein the fulcrum bearing of the flexible element is on the splice bar.

ALBERT E. HILL.